United States Patent Office.

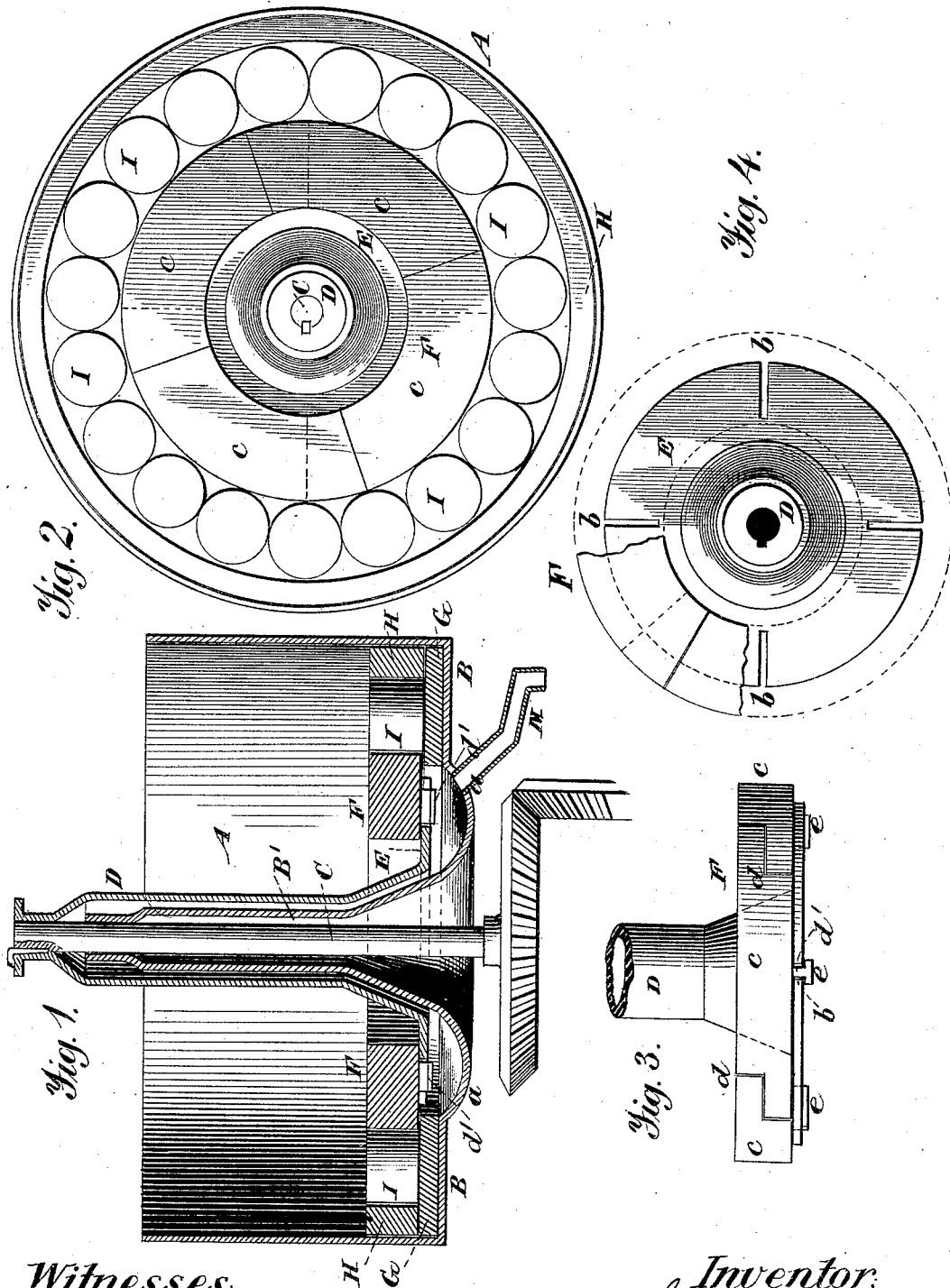

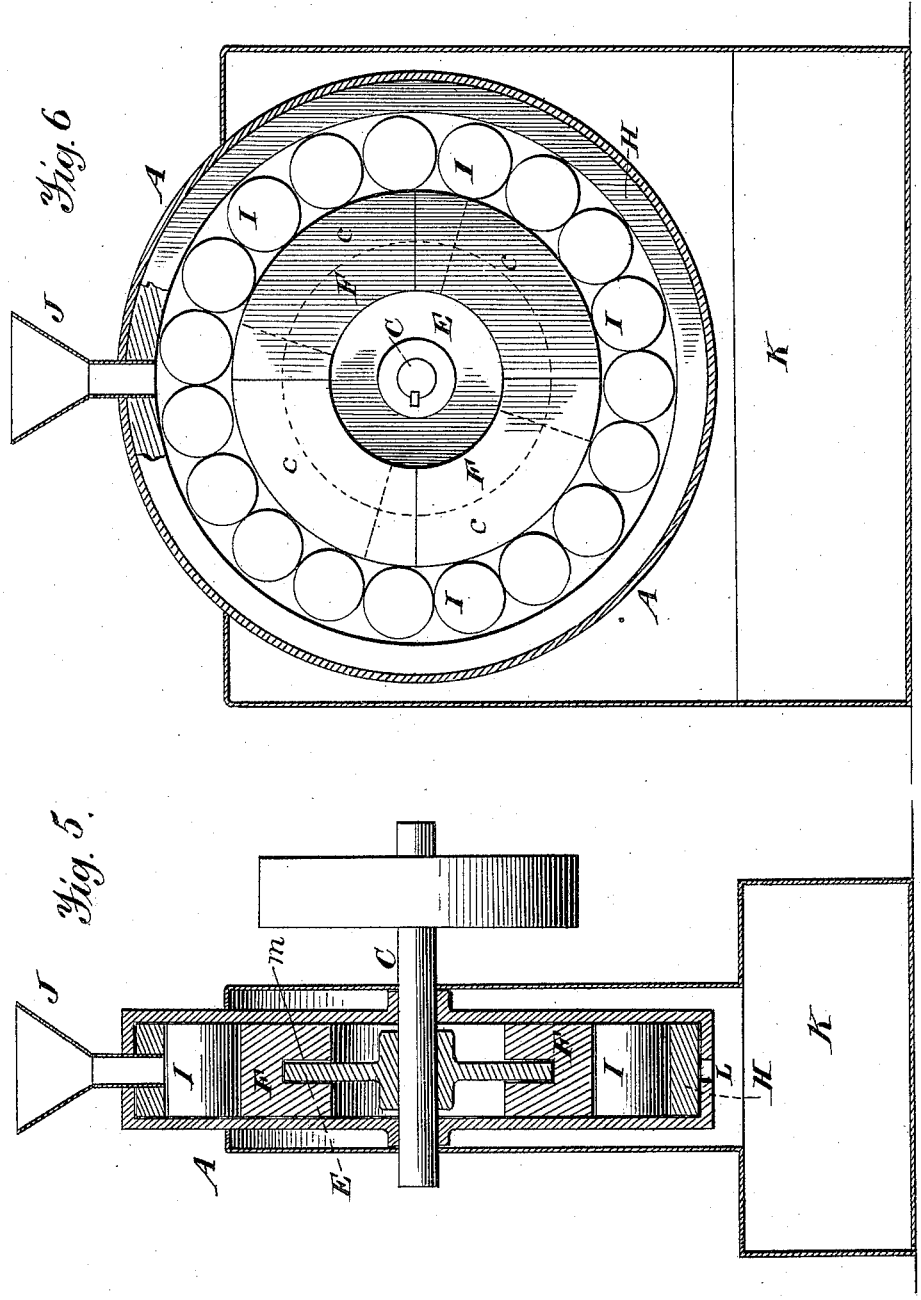

JOHN W. BAILEY, OF DENVER, COLORADO.

MACHINE FOR PULVERIZING ORES.

SPECIFICATION forming part of Letters Patent No. 302,817, dated July 29, 1884.

Application filed December 22, 1883. (No model.)

*To all whom it may concern:*

Be it known that I, JOHN W. BAILEY, of Denver, in the county of Arapahoe and State of Colorado, have invented certain new and useful Improvements in Machines for Pulverizing Ores, of which the following is a specification, reference being had to the accompanying drawings, and to the letters of reference marked thereon.

My invention has reference to ore crushers and pulverizers; and it consists in the improvements hereinafter described and claimed, whereby the highest grinding and crushing capacity is developed in this class of machines, and the working-surfaces made capable of yielding, to permit obstructions to pass through the machine without interfering with its continuous operation.

In the accompanying drawings, Figure 1 is a central transverse section of a machine embodying my improvements. Fig. 2 is a plan view. Fig. 3 is a detail. Fig. 4 is a plan illustrating certain details of construction. Fig. 5 is a central section of a modification, and Fig. 6 a vertical section of the same.

Similar letters of reference indicate similar parts in the several figures.

In Figs. 1 and 2, A represents a cylindrical case or pan, the bottom, B, of which extends downward near the center to form an annular depression, $a$, and then upward at the center to form a central vertical sleeve, B'. A vertical shaft, C, receives a rotary motion from any suitable source of power, and projects up through the sleeve B' a distance above the upper end of the same.

To the upper end of the shaft C is keyed the muller D, which extends down concentrically with the vertical sleeve B', and terminates at its lower end in a disk, E. (See Figs. 1 and 4.) This disk E is provided at or near its periphery with a series of slots, $b$, which are preferably equidistant from each other. An annular bar, F, partly rests on the upper disk, E, as shown in Figs. 1 and 4, and consists of a series of sections, $c$, which are each rabbeted at their ends $d$ to form a lap-joint, as shown in Fig. 3. Each section $c$ has depending from its under side a lug, $d'$, which is provided with a horizontal head, $e$, which, when the section is in position, occupies a position transversely of the length of the slot $b$ in the muller-disk, and prevents any vertical movement of the said sections $c$ on said disk. An annular band, G, of any suitable material, rests on the bottom B of the case A, near the sides thereof, and supports a smaller annular band, H, in contact with said sides, and a series of cylinders, I, arranged in a circle in the pan, as shown in Fig. 2, in proximity to the band H. The shaft C is rotated, imparting a like movement to the muller D and its disk E, and resulting in the sections $c$, composing the bar F, being thrown out in the slots $b$ toward the periphery of said disk E, and brought in contact at their peripheries with the sides of the cylinders I, imparting thereto a rotary movement. This arrangement results in securing for each cylinder I four points on its periphery where the grinding or pulverizing action takes place—one between said cylinder and the annular bar F, one between said cylinder and each of the adjacent cylinders, and the last between said cylinder and the annular band H. When the moving parts have attained a high degree of revolution, the stock is introduced into the pan. It will thus be seen that the highest crushing or grinding capacity is secured for each cylinder I, and that, moreover, the sections $c$, being movable radially with respect to the disk E, can readily recede or yield to permit obstructions to pass from between the grinding-surfaces without disarranging or otherwise interfering with the continuous operation of the machine. The interposition of the annular band G between the bottom B and the under side of the cylinders I prevents the movements of said cylinders from frictionally wearing the bottom. By providing the annular central depression in the bottom B an apartment is provided for a portion of the ground or pulverized material, without any liability of the said material interfering with the movements of the lugs $d$ of the sections $c$ in the slots $b$.

The case A may be completely filled with stock and the same reduced, the machine stopped, and the said stock removed; or, a spout or outlet-pipe, M, may lead from the depression $a$ and deliver the pulverized material into an annular receptacle arranged beneath the case. The sleeve B' embraces the muller-shaft for a distance above the case or pan, and prevents the contents of said pan from working between said shaft and other parts, and also affords an extended bearing for the shaft.

In Figs. 5 and 6 I have illustrated a modification of my machine. In said figures the pulverizing or grinding parts are arranged in a vertical casing. A disk, E, keyed on the horizonal shaft C, supports on its periphery the annular bar F, between which and the band H are arranged the cylinders I. The annular bar in Figs. 5 and 6 is like the bar E of the first-described arrangement, in that it is composed of a series of sections, c, each of which has a rabbeted portion adapted to engage a groove therefor in the section preceding, (see dotted lines, Fig. 6,) the several sections of the bar being capable of a slight centrifugal action upon the rotation of the muller, which extends peripherally in an annular groove, m, formed in said sections c, as shown in Fig. 5. A hopper, J, may be located at the top, and the vertical casing A communicate with the receiving-bin K at the bottom through an opening, L.

I claim—

1. The combination, in an ore grinding or pulverizing machine, of a series of cylinders adapted to form pulverizing or grinding surfaces between each other, and a device mounted on a shaft and moving radially with respect to said shaft and capable of revolving said cylinders under centrifugal action, substantially as set forth.

2. The combination, in an ore grinding or pulverizing machine, of a series of cylinders and an annular bar mounted on a shaft and moving radially with respect to said shaft and capable of revolving said cylinders under centrifugal action by peripheral contact therewith, substantially as set forth.

3. The combination, in an ore grinding or pulverizing machine, of a series of cylinders and an annular bar capable of expanding under centrifugal action to revolve said cylinders, substantially as set forth.

4. The combination, in an ore grinding or pulverizing machine, of a series of cylinders and an annular sectional bar capable of revolving said cylinders under centrifugal action by peripheral contact therewith, substantially as set forth.

5. The combination, in an ore grinding or pulverizing machine, of a series of cylinders, a disk, devices for rotating the same, an annular bar supported by the disk and capable of revolving the said cylinders under centrifugal action by peripheral contact therewith, upon the rotation of said disk, substantially as set forth.

6. The combination, in an ore grinding or pulverizing machine, of a series of cylinders, a disk having slots, devices for rotating the said disk, an annular bar supported by said disk and composed of independent sections, said sections each having an extension playing in one of the slots of the disk, substantially as set forth.

7. The combination, in an ore crushing or grinding machine, of a series of cylinders and an annular bar communicating motion to said cylinders and capable of yielding or moving from said cylinders, substantially as set forth.

8. The combination, in an ore crushing or grinding machine, of a series of cylinders, an annular bar adapted to revolve said cylinders centrifugally by peripheral contact therewith, and the pan having an annular depression formed in its bottom beneath said cylinders, substantially as set forth.

9. The combination, in an ore crushing or grinding machine, of a series of cylinders, a disk, an annular bar supported upon said disk, and having extensions depending in slots in said disk, and the pan having an annular depression in its bottom, substantially as set forth.

10. The combination, in an ore crushing or grinding machine, of crushing or grinding devices located in the case or pan independent of and operated by a muller, and a vertical sleeve extending from the bottom of the pan to embrace the muller-shaft, substantially as set forth.

11. The combination, in an ore crushing or grinding machine, of a series of cylinders, devices mounted on a shaft and moving radially with respect to said shaft for rotating said cylinders, and an annular band interposed between the bottoms of said cylinders and the case or pan bottom, substantially as set forth.

In testimony whereof I have hereunto set my hand and seal this 13th day of December, A. D. 1883.

JOHN W. BAILEY. [L. S.]

Witnesses:
JAMES C. STARKWEATHER,
A. MIALL.